US005737749A

United States Patent [19]
Patel et al.

[11] Patent Number: 5,737,749
[45] Date of Patent: Apr. 7, 1998

[54] METHOD AND SYSTEM FOR DYNAMICALLY SHARING CACHE CAPACITY IN A MICROPROCESSOR

[75] Inventors: Rajesh Bhikhubhai Patel; Romesh Mangho Jessani; Belliappa Manavattira Kuttana, all of Austin, Tex.

[73] Assignees: International Business Machines Corporation, Armonk, N.Y.; Motorola, Inc., Schaumburg, Ill.

[21] Appl. No.: 651,013

[22] Filed: May 20, 1996

[51] Int. Cl.⁶ .................................................. G06F 13/00
[52] U.S. Cl. .................... 711/123; 711/125; 711/129; 711/133; 364/DIG. 1
[58] Field of Search ...................... 395/449, 460, 395/455, 471, 450, 452, 456

[56] References Cited

U.S. PATENT DOCUMENTS

| | | | |
|---|---|---|---|
| 4,719,568 | 1/1988 | Carrubba et al. | 395/450 |
| 5,434,992 | 7/1995 | Mattson | 395/456 |
| 5,537,571 | 7/1996 | Deville | 395/456 |
| 5,551,001 | 8/1996 | Cohen et al. | 395/449 |
| 5,557,763 | 9/1996 | Senter et al. | 395/375 |
| 5,572,704 | 11/1996 | Bratt et al. | 395/449 |
| 5,577,227 | 11/1996 | Finnell et al. | 395/449 |
| 5,603,045 | 2/1997 | Dockser | 395/800 |
| 5,623,627 | 4/1997 | Witt | 395/449 |

*Primary Examiner*—Frank J. Asta
*Attorney, Agent, or Firm*—Brian F. Russell; Andrew J. Dillon

[57] ABSTRACT

A microprocessor that dynamically shares cache capacity comprising a controller that determines if all ways for a congruence class of a requested instruction are valid in the instruction cache and if a replacement way for the congruence class of the requested instruction is valid in a data cache. A lookup for the instruction is performed in the cache tags for the instruction cache and the data cache. If a hit occurs in either cache, the instruction is retrieved. If a miss occurs for the instruction in both the instruction cache and the data cache, the controller loads the instruction into either the instruction cache, if the replacement way is valid in the data cache or at least one way for the congruence class of the requested instruction is not valid in the instruction cache, or the data cache, if the replacement way is not valid in the data cache and all ways for the congruence class of the requested instruction are valid in the instruction cache.

16 Claims, 3 Drawing Sheets

METHOD AND SYSTEM FOR DYNAMICALLY SHARING CACHE CAPACITY IN A MICROPROCESSOR

BACKGROUND

1. Technical Field

The illustrative embodiment relates in general to enhanced cache memory management in a data processing system, and in particular to enhanced cache memory management by dynamically sharing cache capacity in a data processing system.

2. Description of the Related Art

A computer system typically includes an information processor coupled to a hierarchial storage system. The type of storage employed in each staging storage location relative to the processor is normally determined by balancing requirements for speed, capacity, and cost. A commonly employed memory hierarchy includes a direct-access storage device (DASD) for bulk storage, a Random Access Memory (RAM) for main memory, and a special, high-speed RAM memory known as cache for processor caching of data and code that were recently accessed or are located in nearby memory locations. The memory management system dynamically copies parts of memory within this hierarchy for addresses deemed most likely to be accessed soon.

The high-speed processor cache enables relatively fast access to a subset of data and/or instructions which were previously transferred from main storage to the cache, and thus improves the operational speed of the data processing system. Whenever the CPU initiates a memory access, the storage system sends the physical address to the cache. The cache compares the physical address with all of its address tags in a tag memory to see if it holds a copy of the datum. If the operation is a read access and the cache holds the given datum, the cache reads the requested datum from its own high-speed RAM and delivers it to the CPU. This is a cache hit, and it is usually much faster than reading the same value directly from main memory. If the cache does not hold the datum, however, a cache miss occurs and the cache passes the address to the main-memory system to read the datum. If the request also misses in main memory, the necessary blocks are transferred from the disk to the main memory and to the cache. When the datum arrives from the main memory, both the CPU and the cache receive a copy. If the CPU subsequently accesses the same blocks, the request will receive a hit in the cache and the block or cache line will be transferred from the cache and not the main memory, resulting in substantially faster accesses.

However, since the cache memory capacity is smaller than that of the main memory and disk drive, not all the data blocks that may be required by the CPU are always stored in the cache. In order for a new block or cache line to be loaded when the cache is full, blocks must be removed, or cast-out, from the cache to make room for newly accessed data. A well known and commonly used cache replacement algorithm is a Least Recently Used (LRU) algorithm. According to the LRU algorithm, the block which has not been accessed in the cache for the longest period is selected as the least necessary block and is replaced by the new block.

The transfer of operands or instructions between main storage and cache is usually effected in fixed-length units called blocks. A block of data may be transferred in varying sizes such as tracks, sectors, lines, bytes, etc., as are known in the art. However, both main memory and the data array are typically divided into a number of cache lines whose sizes are all equal and generally contain a number of words ranging in size from between 4 and 64 bytes, and so blocks of lines are usually transferred.

Cache memories use different mapping techniques for mapping main memory addresses into its own local addresses. A set-associative cache organizes both main memory and cache memory into columns of N refill lines or cache lines. The cache can map refill line i from any column in main memory into a refill line i of any column in its own RAM data array. Data stored within memory is mapped into a cache line utilizing an index portion of the memory address, which typically is formed by a number of lower-significant bits of the address, such that multiple memory addresses having the same index map to the same cache line(s). Cached data associated with a particular memory address is distinguished from data associated with other addresses having the same index by an address tag, typically the high-order address bits, stored in the tag memory in association with the cached data. The tag address of each cache line contained in the data array is stored in the tag memory along with state information such as the validity status.

An n-way set-associative cache maps memory locations to cache lines at a particular index. Each index forms a congruence class of addresses within memory that share that index. However, the number of columns or "ways" of the cache (i.e. the number of members of the congruence class that may be held in the cache at a given time) is limited by the size of the cache, and so there are less ways than the number of members in the class. Thus, a n-way set-associative cache maps each memory location (cache line) into any of n memory locations (cache lines) in the cache, where n is the number of ways maintained by the cache for each congruence class.

The latest generation of personal computers typically utilize multi-level cache systems that divide the cache memory between an on-chip level-one (L1) processor cache, and a separate, discreet level-two (L2) cache to further enhance system performance. Both cache memories are high-speed Static-RAM. The smaller L1 cache is integrated within the processor, significantly increasing the access speed of cache memory. The L2 cache is larger, typically in the range of 500 KB–1 MB, and increases performance by storing a larger block of data that includes the block of data stored in the L1 cache.

Microprocessor level-one caches are often implemented as a "split-cache" with separate internal caches for caching instructions and data. A split-cache has a separate instruction cache (Icache) and data cache (Dcache), each having its own address and control ports. Such a configuration provides more efficient caching because the addressing of instructions tends to be much more serial than the addressing of data. By separating the caching functions for these two types of information, substantial efficiencies can be created by preventing the high I/O of the data cache from interfering with the high locality of reference of instructions in the instruction cache. In order to exploit these advantages, as is commonly implemented in modern microprocessors, no sharing of these memory spaces may occur, and their functionality is defined distinctly and separately.

With the rapid increase in processor speed, memory access time lags pose a bottleneck to improved processor performance. Increasing the size of the level-one and level-two caches partially solve this problem because of their shorter access times. The size of on-chip internal caches, however, often determine the cost of the processor, since they occupy large chip areas. This forces designers to trade-off the various considerations of die-size, area, cost, design time, performance, etc. Consequently, cache management mechanisms utilize various schemes and algorithms to make efficient use of the cache to improve processor performance. One important function of the cache management system is the replacement of existing lines in the cache with new cache lines that are required by the processor. In a set-associative cache, only a given number of "ways" of the congruency class may be held in the cache, so that when the ways are full within the cache and a member of the class must be loaded into the cache, the cache management system will select one of the ways within the cache for replacement, typically using a LRU replacement scheme. For example, in an eight-way set-associative cache, only eight lines with a given index can be held in the cache. If a ninth cache line with the same index is required, it would replace one of the existing eight cache lines having that index.

Because increasing the size of the cache substantially increases the cost, the number of members of the congruence class that may be held by the cache is necessarily limited by the size of the cache. Consequently, it would be desirable to dynamically increase the number of cacheable members of a particular congruence class without increasing the on-chip cache size or reducing performance. Such a system would enhance performance by increasing the amount of cached information available to the CPU.

SUMMARY

A method and system for dynamically sharing cache capacity among caches is provided. A request for information of a type associated with a first cache and belonging to a particular class of information is received. The system determines if the information is contained in the first cache, and if the information is contained in a second cache. If the information is not contained in the first cache and the second cache, the information is loaded into either the first cache or the second cache. If at least one replacement member of one or more replacement members of the class of information is not valid in the second cache and all members of the class of information are valid in the first cache, the information is loaded in the second cache. If the replacement member of the second cache is valid or at least one member of the class of information in the first cache is not valid, the information is loaded in the first cache. The above, as well as additional objects, features, and advantages of the illustrative embodiment will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
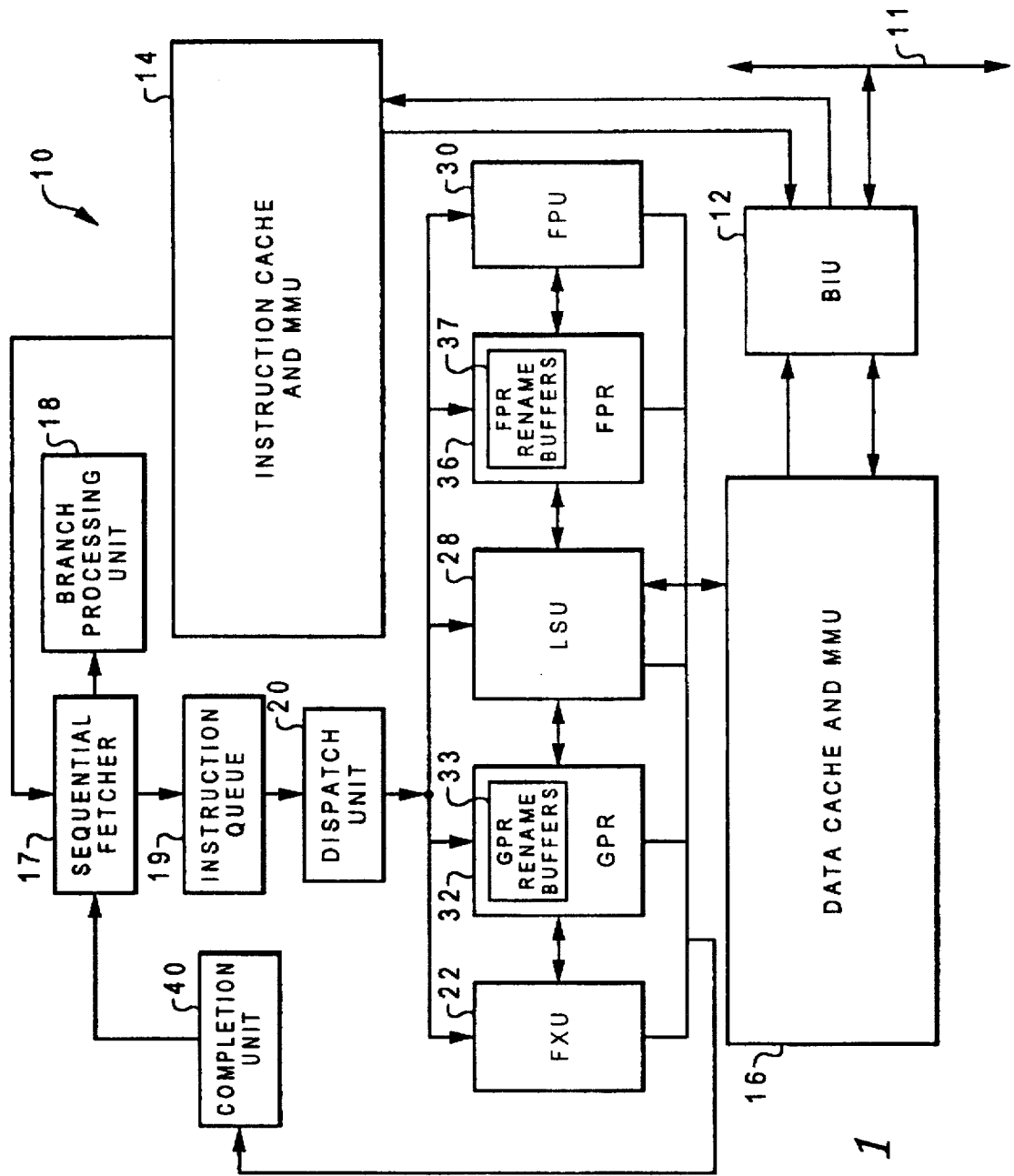
FIG. 1 illustrates a block diagram of a processor for processing information according to a preferred embodiment of the present invention.

With reference now to the figures, and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor capable of executing multiple instructions per processor cycle. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors produced by International Business Machines, Inc., which operates according to reduced instruction set computing (RISC) techniques.

As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system. BIU 12 is connected to instruction cache (Icache) 14 and data cache (Dcache) 16 within processor 10. High speed caches, such as instruction cache 14 and data cache 16, enable processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 for execution.

Sequential fetcher 17 transfers branch instructions to branch processing unit (BPU) 18 for execution, and transfers sequential instructions to instruction queue 19 for temporary storage before being executed by other execution circuitry within processor 10. BPU 18 executes branch instructions, which change the sequence in which the instructions in the computer program are performed, and performs static and dynamic branch prediction on unresolved conditional branches to allow speculative instructions to be fetched and executed. Instructions issued beyond a predicted branch do not complete execution until the branch is resolved, preserving the programming model of sequential execution. Sequential instructions are transferred from instruction queue 19 to dispatch unit 20 to be dispatched to their respective execution units, the dispatch rate being contingent upon execution unit busy status, rename and completion buffer availability, and the serializing behavior of some instructions. Dispatch unit 20 performs source and destination register dependency checking and renaming on instructions dispatched in parallel or out-of-order. Completion unit 40 tracks instructions from dispatch through execution, and then retires, or "completes" them in program order. Completing an instruction commits the process to any architectural register changes caused by that instruction. In-order completion ensures the correct architectural state when the microprocessor must recover from a mispredicted branch or any exception.

In the depicted embodiment, in addition to BPU 18, the execution circuitry of processor 10 comprises multiple execution units, including fixed-point unit (FXU) 22, load/store unit (LSU) 28, and floating-point unit (FPU) 30. These execution units can execute instructions simultaneously during a single processor cycle. Each of execution units 18, 22, 28, and 30 can execute one or more instructions within a particular class of instructions. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32 or FPRs 36, or that store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

Figure 2:
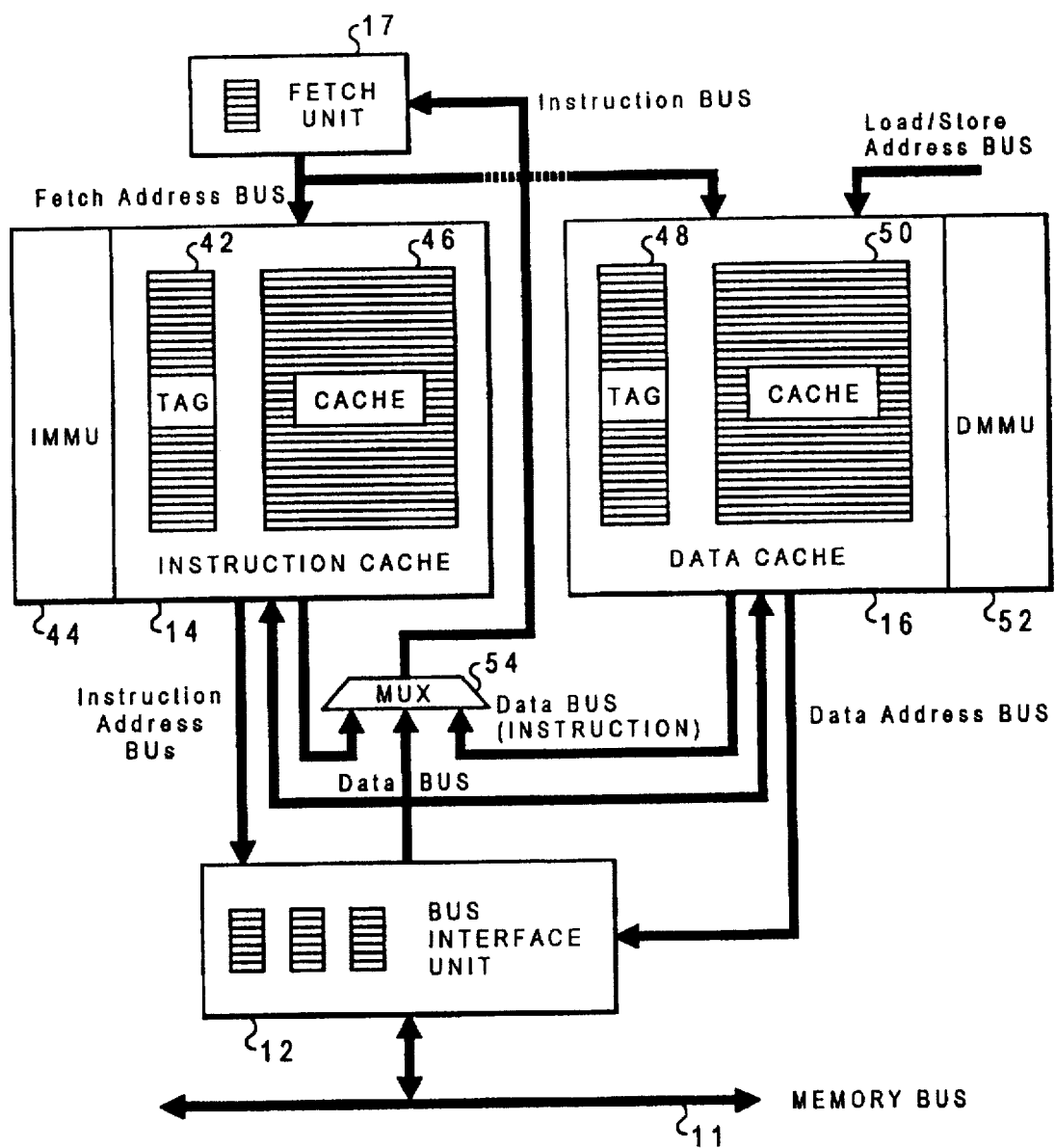
FIG. 2 shows a detailed block diagram of the cache memory system for the microprocessor of FIG. 1 in accordance with a preferred embodiment of the present invention.

With reference now to FIG. 2, there is shown a detailed block diagram of the cache memory system for the microprocessor of FIG. 1. When a request for instructions from the Fetch Unit (Sequential Fetcher) 17 is received at the Instruction Cache Tags (Itags) 42, the Icache controller (IMMU) 44 searches the indexed cache line (i.e., congruence class) within the Itags for the requested tag. If the request hits in the Itags, the instruction(s) are read out of the Icache array 46 into Mux 54 through to fetch unit 17. If the request misses in the Itags, a look-up for the requested instruction is performed in the Data Cache Tags (Dtags) 48 under specified conditions (as described below). If the request hits in the Dcache, the instruction is read out of Data Cache Array 50 into Mux 54 through to fetch unit 17. According to the present invention, under specified conditions, processor performance can be improved by dynamically increasing the Icache space by utilizing unused Dcache space to provide a virtual Icache larger than the on-chip Icache. This allows improvements in performance by allowing faster processor access to instructions.

If the request misses in both the Itags 42 and the Dtags 48, the instruction must be retrieved from main memory. If at least one way in the cache line at the index corresponding to the requested instruction's address is not valid in the Icache, the linefill is performed into the Icache by replacing one of the invalid ways of that index with the retrieved instruction. The retrieved instruction(s) is also transferred from BIU 12 to the fetch unit 17 through Mux 17. If, however, all the ways in the Icache are valid, one or more replacement ways in the Dcache in the cache line for the requested instruction's index are checked to determine whether they are valid. If the replacement way is valid in the Dcache, the linefill operation is performed to the Icache so that valid data is not replaced in the Dcache. If, however, the way is invalid in the Dcache, the linefill is performed to the Dcache and the instruction(s) is forwarded to the fetch unit 17.

The replacement scheme would ensure that the replacement way is chosen to be replaced the next time this line is accessed in the Dcache, ensuring that the replacement scheme is unchanged for the Dcache. As will be appreciated, when the fetch unit next accesses the same cache line (i.e., the same index) within the Icache, the instruction(s) will be fetched from either the cache line in the Icache or the replacement way(s) in the Dcache, making it appear as if the set of ways of the Icache has increased. It should be noted that any block invalidation of the Icache must also be performed on the replacement way(s) within the Dcache.

Figure 3:
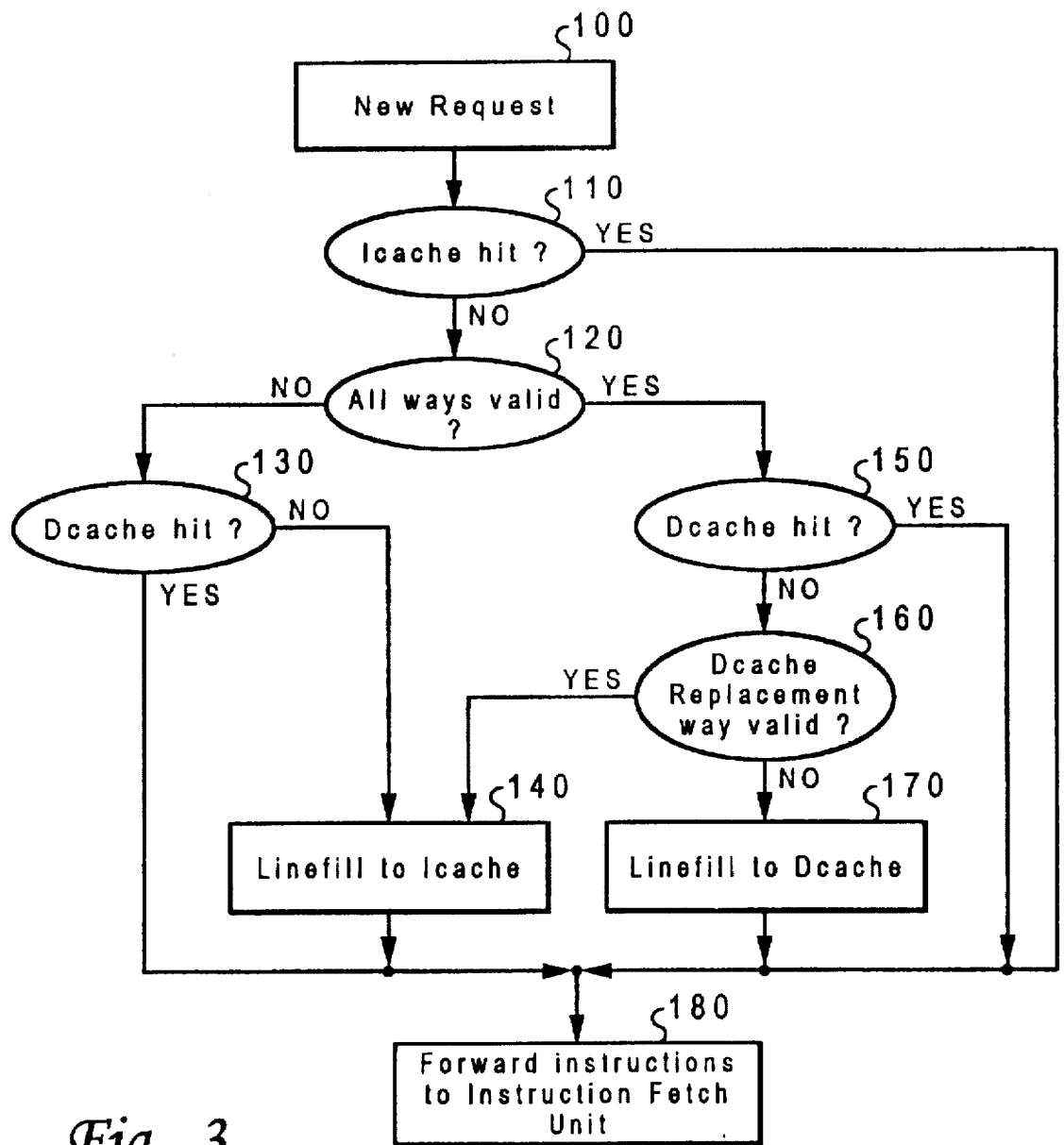
FIG. 3 shows a flow diagram of the method of dynamically sharing cache capacity among caches, in accordance with a preferred embodiment of the present invention.

Referring now to FIG. 3, there is shown a flow diagram of the method of dynamically sharing cache capacity among caches, in accordance with a preferred embodiment of the present invention. At step 100, a new instruction request is received from the instruction fetch unit 17 at the instruction cache 14. At decision block 110, it is determined if the new request hits in the Itags 42. If a hit occurs in the Itags, the method proceeds to step 180, where the instructions are read out of the Icache array and forwarded to the instruction fetch unit 17. If the address tag for the new request does not hit in the Icache, the process proceeds to decision block 120 where it is determined if all ways associated with the index of the new request are valid in the Icache. The process proceeds to decision block 130 if at least one way is invalid, and a look-up is performed in the Dtags 48 at the cache line associated with the instruction's index. If there is a hit in the Dcache, the method proceeds to step 180 where the instruction (or instructions) requested in the Dcache are forwarded to the instruction fetch unit 17. If the new request does not hit in the Dcache, the method proceeds to step 140 where a linefill is performed to bring the requested instruction into the invalid way(s) of the Icache from main memory. The instruction is then forwarded to the instruction fetch unit 17 at step 180.

If a determination is made at step 120 that all ways associated with the index of the new request are valid in the Icache, the method performs a look-up in the Dtags 48 for the requested instruction, as shown at decision block 150. If a hit occurs in the Dcache for the requested instruction, the instruction is forwarded to the instruction fetch unit 17, as shown at step 180. If a hit does not occur in the Dcache, the method proceeds to decision block 160 where the validity of the Dcache replacement way(s) is determined. If the Dcache replacement way is valid, the method performs a linefill into the Icache, as shown at step 140, so that the valid information stored in the Dcache is not cast-out or overwritten in the Dcache. However, if the replacement way in the Dcache is not valid, the linefill of the instruction from main memory is made to the Dcache at the replacement way, as shown at step 170. The instructions that have been retrieved from main memory and loaded into either the Icache or the Dcache are also forwarded to the instruction fetch unit 17 as shown at step 180.

According to the illustrative embodiments, the look-up in the Dtags 48 can be performed either simultaneously with the Itag look-up or after a miss is detected in the Itags 42. In one embodiment, if the Dtag is a single-ported device and is busy with a data access, the Icache control will not perform a parallel Dtag look-up while searching the Icache Tags. In this case, a linefill request is sent to the BIU to fetch the instructions from main memory once a miss is detected in the Itag. In an alternative embodiment, the Icache would wait for the Dcache access to complete and then perform a Dtag look-up for the searched tag before sending a linefill request to the BIU. This does not degrade processor performance, since the probability of hitting in the Dcache increases when all the Icache ways are found to be valid. If a hit is signaled in the Dtags 48, the Icache forwards the instructions to the fetch unit 17 when the Dcache array is no longer busy satisfying a Dcache access. In both embodiments, if the Dtag is currently idle during a particular Itag look-up, or if the Dtag is a dual-ported device, a parallel look-up is performed in the Dtags 48.

While the present embodiment has been described as a method and system for dynamically increasing the Icache capacity to improve performance of the cache memory system, the scope of the present invention encompasses dynamically increasing the cache capacity of any type of cache by dynamically sharing cache capacity among caches, and not just the Icache. In particular, the present invention could be applied to provide a virtual Dcache larger than the Dcache itself by accessing unused Icache space similarly to the embodiment described above. As will be appreciated, the implementation of such an embodiment of the present invention would require additional snooping logic to be incorporated into the Icache to provide for cache coherency of any data that may be stored in the Icache other than instructions. While an illustrative embodiment has been particularly shown and described, it will be understood by those skilled in the art that various changes in form and detail may be made therein without departing from the spirit and scope of the invention.

What is claimed is:

1. A method for dynamically sharing cache capacity among caches, the method comprising the steps of:

receiving a request for information of a type associated with a first cache and belonging to a particular class of information;

determining if the information is contained in the first cache;

determining if the information is contained in a second cache;

if the information is not contained in the first cache and the second cache:

determining if all members of the class of information are valid in the first cache and determining if at least one replacement member of one or more replacement members of the class of information is valid in the second cache;

if the replacement member of the second cache is not valid and all members of the class of information in the first cache are valid, placing the information in the second cache; and if the replacement member of the second cache is valid or at least one member of the class of information in the first cache is not valid, placing the information in the first cache.

2. A method according to claim 1, further comprising the step of transmitting the requested information from the cache containing the information to a device making the request.

3. A method according to claim 1, wherein the first cache is an instruction cache and the type of information is instructions, said step of determining if the information is contained in the first cache comprising the step of determining if specified instructions are contained in the first cache.

4. A method according to claim 1, wherein the first cache is a data cache and the type of information is data, said step of determining if the information is contained in the first cache comprising the step of determining if specified data are contained in the first cache.

5. A method according to claim 1, wherein the determinations whether the information is contained in the first cache and the second cache are performed simultaneously.

6. A method according to claim 1, wherein said second cache is associated with a second type of information, said method further comprising the step of:

in response to a determination that said information is contained in said second cache, outputting said information from said second cache.

7. A system for dynamically sharing cache capacity among a first cache and a second cache in a data processing system, the system comprising:

means for determining if requested information of a type associated with the first cache is contained in the first cache;

means for determining if the requested information is contained in a second cache;

means for, if the requested information is not contained in the first cache and the second cache:

determining if all members of the class of information are valid in the first cache and determining if at least one replacement member of one or more replacement members of the class of information is valid in the second cache;

if the replacement member of the second cache is valid and all members of the class of information in the first cache are valid, placing the information in the second cache; and if the replacement member of the second cache is valid or at least one member of the class of information in the first cache is not valid, placing the information in the first cache.

8. A system according to claim 6, wherein the first cache is an instruction cache and the type of information is instructions.

9. A system according to claim 6, wherein the first cache is a data cache and the type of information is data.

10. A system according to claim 6, wherein the determinations whether the information is contained in the first cache and the second cache are performed simultaneously.

11. A system according to claim 7, further comprising means for transmitting the requested information from the cache containing the information to a device making the request.

12. A system according to claim 7, wherein said second cache is associated with a second type of information, said system further comprising means, responsive to a determination that said information is contained in said second cache, for outputting said information from said second cache.

13. A microprocessor that dynamically shares cache capacity, said microprocessor comprising:

a plurality of cache units, including an instruction cache and a data cache;

an instruction fetch unit that requests instructions from the instruction cache, wherein an address of a requested instruction indicates that the requested instruction belongs to a particular class of information; and a controller that, if a miss occurs for the requested instruction in the plurality of caches, loads the requested instruction into the data cache, if a replacement member of the particular class of information is not valid in the data cache and all members of the particular class of information are valid in the instruction cache, and that loads the requested instruction into the instruction cache, if the replacement member is valid in the data cache or at least one member of the particular class of information is not valid in the instruction cache.

14. A microprocessor according to claim 13, wherein the controller sends the requested instruction to the instruction fetch unit from the plurality of cache units, in response to a cache hit for the requested instruction in the plurality of caches.

15. A microprocessor according to claim 13, wherein the controller sends the requested instruction to the instruction fetch unit from the plurality of cache units, in response to the requested instruction being loaded in the plurality of caches.

16. A microprocessor according to claim 13, wherein said controller causes said data cache to output the requested instruction to the instruction fetch unit if a hit occurs for the requested instruction in the data cache.

* * * * *

UNITED STATES PATENT AND TRADEMARK OFFICE
CERTIFICATE OF CORRECTION

PATENT NO. : 5,737,749
DATED : April 7, 1998
INVENTOR(S) : Patel et al.

It is certified that error appears in the above-identified patent and that said Letters Patent is hereby corrected as shown below:

Column 9, lines 14-16 change Claim 10 "A system according to claim 6, wherein the determinations whether the information is contained in the first cache and the second cache are performed simultaneously." to --A system according to Claim 6, wherein the means for determining if the information is contained in the first cache and the means for determining if the information is contained in the second cache together comprise means for simultaneously determining if the information is in the first cache or the second cache.--

Signed and Sealed this

Twenty-fifth Day of August, 1998

Attest:

BRUCE LEHMAN

*Attesting Officer*  *Commissioner of Patents and Trademarks*